United States Patent [19]

Reichert et al.

[11] Patent Number: 5,070,735

[45] Date of Patent: Dec. 10, 1991

[54] PRESSURE SENSOR

[75] Inventors: Hansjoerg Reichert, Munich; Karl Platzoeder, Haimhausen; Guenter Ehrler, Deisenhofen, all of Fed. Rep. of Germany

[73] Assignee: Siemens Aktiengesellschaft, Berlin and Munich, Fed. Rep. of Germany

[21] Appl. No.: 530,338

[22] Filed: May 30, 1990

[30] Foreign Application Priority Data

May 30, 1989 [EP] European Pat. Off. ........... 89109718

[51] Int. Cl.⁵ .......................... G01L 7/08; G01L 9/06
[52] U.S. Cl. .......................................... 73/727; 338/4
[58] Field of Search ................ 73/726, 727, 720, 721, 73/717, 718, 719, 719, 722, 723, 724, 725, 728, 706, 708; 338/4, 42; 361/283; 336/30

[56] References Cited

U.S. PATENT DOCUMENTS

| 4,028,945 | 6/1977 | Bergamini | 73/706 |
| 4,135,408 | 1/1979 | DiGiovanni | 73/706 |
| 4,649,363 | 3/1987 | Starr | 338/4 |
| 4,761,210 | 8/1988 | Ehrler et al. | 204/129.65 |

FOREIGN PATENT DOCUMENTS

| 0217071 | 4/1987 | European Pat. Off. |
| 2677128 | of 0000 | Fed. Rep. of Germany. |
| 3436440 | 4/1986 | Fed. Rep. of Germany ........ 73/721 |
| 2069703 | 8/1981 | United Kingdom. |

OTHER PUBLICATIONS

Japanese Abstract of Japan 58-151536, vol. 7, No. 270, (P-240) Dec. 2, 1983, 1415.

Primary Examiner—Donald O. Woodiel
Attorney, Agent, or Firm—Hill, Van Santen, Steadman & Simpson

[57] ABSTRACT

A silicon membrane pressure sensor which has a carrier chip and a membrane chip 3 for which overload protection is desired to protect against the pressure on the front side of the membrane. An overload member 7 is mounted between the carrier chip 2 and the membrane chip 3 such that the overload member is connected to the membrane chip at a middle island portion 5 of the membrane chip 3 and with a first distance D1 from the carrier chip 2 in the non-loaded condition such that when pressure occurs the overload member will remove the load on the membrane chip.

4 Claims, 2 Drawing Sheets

PRESSURE SENSOR

BACKGROUND OF THE INVENTION

1. Field of the Invention

This invention relates in general to a piezo-resistive silicon membrane pressure sensor in which an overload member is mounted between the membrane chip and the carrier chip so as to protect the membrane.

2. Description of Related Art

The overload strength of piezo-resistive silicon membrane pressure sensors can amount to approximately twenty times the nominal pressure in the low pressure range which is too low for many applications. When measuring pressure differences in the millibar range in high pressure systems for example, the full system pressure can act on the pressure sensor as a differential pressure as a consequence of a local pressure drop for example, due to a rupture in the line. The overload factors of about 1000 and above are therefore required in actual practice. An additional overload protection which is effective independently of the direction of the pressure, in other words, independently of whether the overpressure acts on the front or on the backside of the membrane of the pressure sensor must therefore be realized in a pressure sensor for such applications.

Up to the present time silicon pressure sensors were usually protected against destruction by using complicated mechanical designs which have metal membranes or overload valves. Critical advantages of silicon pressure sensors however, are therefore lost, namely, the advantages of small dimensions and low weight and low cost.

The small inertia of silicon pressure sensors represents an additional problem because silicon pressure sensors have a natural frequency of approximately 50kH. The silicon pressure sensors therefore must be more inert with damping since the mechanical protective measures would otherwise fail when extremely short pressure surges occur. On the other hand, the quick acquisition of the pressure is exactly what is needed in many applications so that a solution without damping is desirable.

Prior to the above-mentioned macro-mechanical solutions with metal membranes or overload valves, a micro-mechanical solution was known providing an integrated protection against overload from the backside of the membrane. This known integrated overload protection however is effective only for overloads in one direction.

See also U.S. Pat. No. 4,761,210, U.S. Pat. No. 4,028,945, British Patent Application 2,069,703, the European Patent Application 0,217,071, German 77 03 675 and Japanese Patent Abstracts Volume 7, No. 270, Dec. 2, 1983 No. 58-151536.

SUMMARY OF THE INVENTION

It is an object of the invention to provide a pressure sensor that has overload protection which protects against the influence of pressure on the front side of the membrane.

It is a feature of the present invention that an overload member is mounted between the carrier chip and the membrane chip such that the overload member is connected to the membrane chip at a middle island of the membrane chip and has a first distance D1 from the carrier chip in the non-loaded condition.

The overload protection device is micro-mechanically integrated into the semiconductor component in a pressure sensor of the invention.

The combination of an overload protection device of the invention with the integrated protection against the overload for pressure on the backside of the membrane which is already known allows a desired overload protection to be accomplished which is effective in both directions of pressure either overpressure on the front side as well as an overpressure on the backside of the membrane.

A low pressure sensor is more advantageously constructed as a ring membrane sensor to obtain improved linearity.

Two measures can be accomplished so as to protect the pressure sensor against overload from the front side of the membrane. These are (1), by limiting the stroke D1 of the center island of the membrane portion the force which acts on the rigid middle portion of the membrane part is intercepted. A noticeable increase in the overload strength of the pressure sensor results from this measure.

(2), the limitation of the deflection of the membrane is additionally limited by a seating surface which is arranged at a distance D2 under the membrane.

The overload strength obtained is greater for the tighter the stroke limitation D1 of the middle island of the membrane portion and the closer the supporting surface lies to the membrane, in other words, smaller the distance D2. A limitation of the stroke D1 toward low values results in that the middle island of the membrane portion is reliably prevented from striking a carrier portion in the working range of the pressure sensor. The stroke D1 obtained for the range measurement is extremely small because of the greatly increasing non-linearity of the carrier sensor given great deflections. The stroke D1 is dependent on the chip size and on the required linearity. The stroke D1 is usually less than three micro-meters for semiconductor components having dimensions below 1cm × 1cm.

The present invention achieves the object of building an overload member with tolerances in the micrometer range to a semiconductor pressure sensor and fixing it such that no disturbing influence in the work range of the pressure sensor results. The stroke D1 and the distance D2 between the seating surface of the overload member and the membrane can be optimally designed to be small by taking such limitations into consideration.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
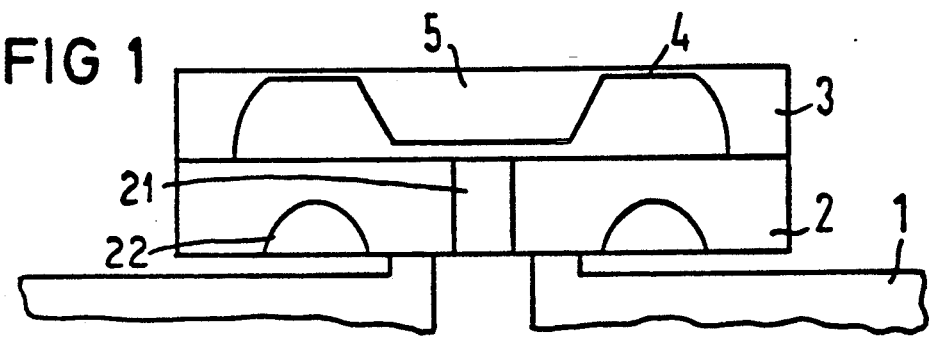
FIG. 1/is a sectional view which illustrates a pressure sensor without overload protection.

FIG. 1 illustrates a ring pressure membrane sensor 10 which does not have overload protection. Such a pressure sensor can be manufactured using the method disclosed in German DE-A 35 34 860. Such a pressure sensor includes a housing 1 into which pressure is applied and includes a carrier chip 2 mounted on the housing which has a pressure admitting opening 21. A membrane chip 3 which has a membrane 4 and is formed with a middle island portion 5 within the membrane 4 is mounted on the carrier chip 2 as shown. For high precision applications, the carrier chip 2 can have an additional annular groove 22 on its backside for coupling the membrane 3 from the housing I. It is to be realized that the membrane 3 may be substantially round in plan view and that FIG. 1 comprises a sectional view through the structure.

Both the carrier chip 2 and the membrane chip 3 have structures of different depths. At least two different selectively removing etching masks are selectively applied onto a solid for producing structures in micromechanics that have different depths. After removal of the etching mask which is last applied, a further structuring step occurs with the assistance of the etching mask that then remain on the solid material. Removing further etching masks and producing a further structuring step are repeated until the number of structuring steps utilized is the same as the number of etching masks that were originally present on the solid.

Selectively removal etching masks for example, comprise an etching mask composed of a titanium-gold layer and an etching mask composed of photoresist.

For manufacturing the carrier chip 2 for example, the through-hole 21 can be pre-etched in a first structuring step up to a depth of approximately 300mm and this hole can be completely etched through in a second structuring step down to a depth of approximately 400mm and the annular groove 22 which has a depth of 100mm can be etched around the through-hole during the second structuring step.

For manufacturing the membrane chip 3, the pre-etching of the ring member can be undertaken in a first etching step. The fine etching down to the final thickness of the ring member together with the thinning of the middle island 5 occurs during the etching which is accomplished in a second etching step. In the specific instance of the membrane chip 3, the second etching step can comprise an electro-mechanical fine etching process with an automatic etch stop. It is necessary to etch the end of the middle island 5 off so as to enable free movement of the ring membrane 4.

Figure 2:
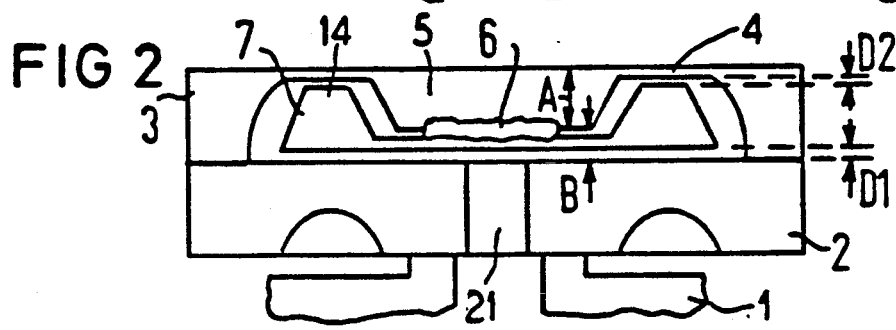
FIG. 2 illustrates a pressure sensor with the overload protection of the invention.

FIG. 2 illustrates he invention which comprises a pressure sensor similar to that of FIG. I, but which also includes an overload member 7 mounted between the membrane chip 3 and the carrier chip 2. The pressure sensor of FIG. 4 with the overload protection 7 is essentially comprised of three individual parts that are joined to each other at the regions indicated in FIG. 2. The three components comprise a conventional membrane chip 3, a carrier chip 2 and an overload member 7 of the configuration shown in FIG. 2. The membrane chip 3 is constructed in a conventional manner similar to the membrane chip 1 shown in FIG. 1. For a pressure sensor that has overload protection, the middle island 5 of the membrane chip is additionally etched back by about 50mm more than in the pressure sensor of FIG. 1 and is made thinner so as to create a space for a manipulatable stable and somewhat thicker overload member 7.

In the exemplary embodiment of FIG. 2, the overload member is formed with a central portion which fits beneath the middle island 5 and has an extending annular portion 14 which is between the membrane 4 and the carrier chip 2. The overload member 7 may be dynamically balanced and has the axial section profile illustrated in FIG. 2. The middle region of the overload member 7 is rigidly attached to the middle island 5 of the membrane chip 3, as for example, by solder 6. The annular upper seating surface 14 of the overload member 7 that is located in the area of the membrane of the membrane chip 3 and is spaced a distance D2 from the membrane 4 which is a distance of approximately 5mm from the ring membrane of the membrane chip in the non-loaded condition. In this non-loaded condition, the lower surface of the overload member 7 has distance D1 from the carrier chip 2. The carrier chip 2 is formed in the same manner and has the same configuration as the carrier chip 2 of the prior art device of FIG. 1.

The center hole 21 of the carrier chip 2 serves the purpose of supplying the reference pressure onto the backside of the membrane 4.

When a pressure load on the upper side (front side) of the membrane 4 of the membrane chip 3 occurs, the middle island 5 together with the overload 7 which is connected to the middle island move in the downward direction toward the carrier chip 2. The overload member will engage the carrier chip 2 beginning with a certain pressure Pl that ca be set by adjusting the dimension D1. The distance D1 between the seating surface of the overload member 7 and the membrane 4 is set such that the membrane lies against the overload member 7 at approximately 2-5 times the nominal pressure.

When the overload member 7 engages the carrier chip at a certain pressure Pl a further increase in pressure will no longer effect any movement of the middle island toward the carrier chip 2. Only the ring member 4 which is clamped in quasi-rigid fashion continues to be deflected with a further increase in pressure and begins to engage the upper seating surface 14 of the overload member at a pressure P2 which is adjustable by varying the distance D2. As a consequence, a majority of the force acting on the membrane 4 is transmitted to the overload member 7 beginning with pressures which are higher than a pressure of P2. The possible limit load of the ring member 4 increases dramatically by reducing the effective freely suspended membrane area.

The invention can also be utilized for non-annular shaped membranes 4.

FIGS. 3–8 illustrate various possibilities for manufacturing a pressure sensor. The carrier chip 2 and the membrane chip 3 are conventionally constructed. The invention can therefore be limited to the manufacture of the overload member 7 and to the integration of the overload member 7 in the semiconductor pressure sensor. The method disclosed here can be implemented both with individual semiconductor chips as well as in a wafer structure. For the manufacture of pressure sensors in a wafer structure, FIGS. 3-8 and the descriptions describes wafer portions.

Figure 3:
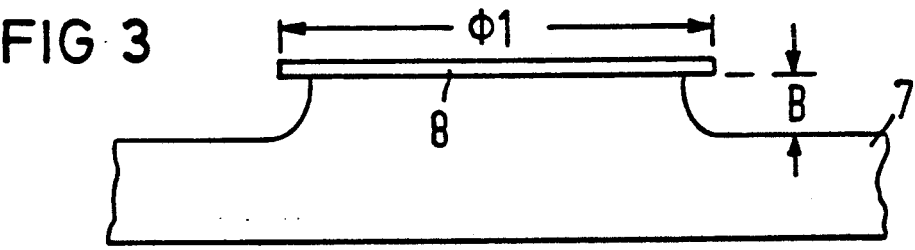
FIG. 3 is a view illustrating a method of manufacturing a pressure sensor.
Figure 4:
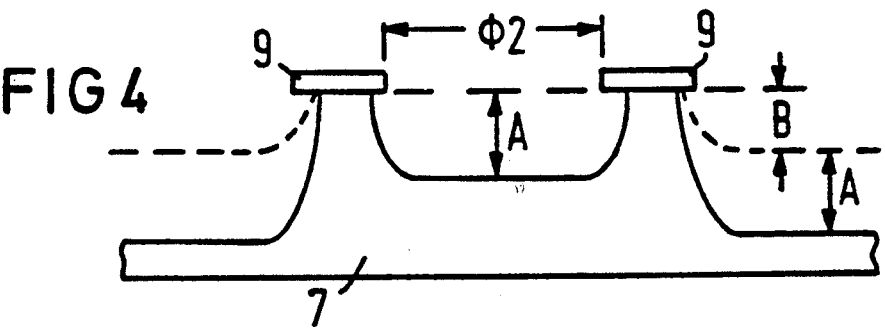
FIG. 4 is another view illustrating a method of manufacturing a pressure sensor.

FIGS. 3 and 4 illustrate the method of manufacture of the overload member 7. As shown in the cross-sectional illustration of FIG. 3, a circular region in a silicon semiconductor wafer which must be thicker than the membrane chip 3 is masked with a masking layer 8 so as to prevent silicon etching during a first photo-technique step. The diameter of the circular region provided by the masking layer 8 corresponds to the outside diameter of the silicon membrane 4. The etching depth during the following, wet-chemical silicon etching is somewhat more than the distance B shown recited in FIG. 2 which is the distance of the middle island 5 from the carrier chip 2 in the non-loaded condition. As is indicated in FIG. 2, the middle island 5 has a thickness of A. The membrane chip 3 therefore has an overall thickness of A +B.

In a second photo-technique step, which can be similar to the manufacture of the carrier chip 2 and of the membrane chip 3, can occur with a method for generating structures in micro-mechanics as disclosed in DE-A-35 34 860, an annular region at the edge of the circular region produced in the first photo-technique step is produced (FIG. 4) concentrically with the circular region which wa manufactured during the first photo-technique step. The etching mask 9 now roughly corresponds to the geometry of the ring membrane 4. The overall thickness of this etching mask 9 is set to a thickness of about 5μm for reasons to be later discussed. A silicon etching is again carried out with this annular mask 9, now with an etching depth somewhat greater than A which is the thickness of the middle island 5.

The circular region of the masking layer 8 of FIG. 3 has a diameter of PHI1. The etching mask 9 that is annular has an outside diameter of approximately PHI1 and has an inside diameter PHI2 concentric with the outside diameter. The outside diameter of the etching mask 9 coincides roughly with the outside diameter of the ring membrane 4. The inside diameter of the etching mask 9 roughly coincides with the inside diameter of the ring membrane 4.

The semiconductor wafer from which the overload member 7 is constructed is thus finished for assembly. Outside of the etching mask 9, the overload member 7 has an etching depth of A +B plus the tolerance allowance. In the inner region of the annular etching mask 9, the overload member 7 has an etching depth of A plus the tolerance allowance. The raised annular region of the overload member directly under the etching mask 9 is somewhat narrower than the membrane region 4 of the membrane chip 3 due to unavoidable under-etchings.

Figure 5:
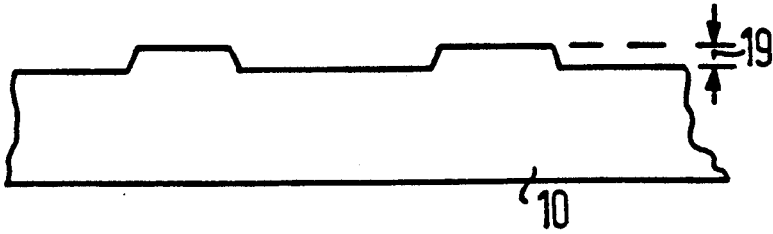
FIG. 5 is another view illustrating a method of manufacturing a pressure sensor.

FIG. 5 illustrates an auxiliary silicon wafer 10 that is employed for the assembly of the semiconductor pressure sensor. The auxiliary wafer 10 has humps which have a height 19 of approximately 15μm. These humps are arranged on the auxiliary wafer 10 in the same grid that the membrane chip 3 is arranged on a membrane chip wafer. The hump diameter is somewhat smaller than the inside diameter of the membrane 4.

Figure 6:
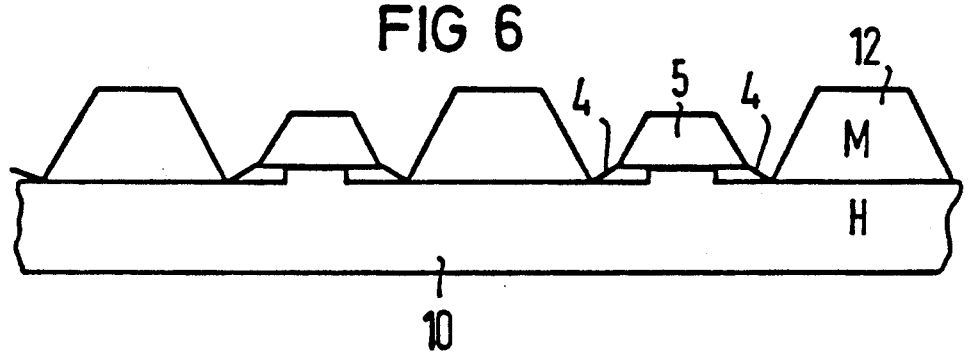
FIG. 6 is a sectional view illustrating a method of manufacturing a pressure sensor.

As shown in FIG. 6, the membrane chip wafer 12 is glued onto or, respectively, waxed onto an auxiliary wafer 10 under slight pressure with its upper side down and is adjusted such that the regions of the middle islands 5 lie on the humps of the auxiliary wafer 10. The membranes 4 are deflected as a consequence. When the hump height 19 is a x-fold multiple of the stroke of the middle island 5 at nominal pressure, then the deflection of the membrane 4 in the glued-on condition of FIG. 6 thus corresponds to the load with x-fold nominal pressure.

Figure 7:
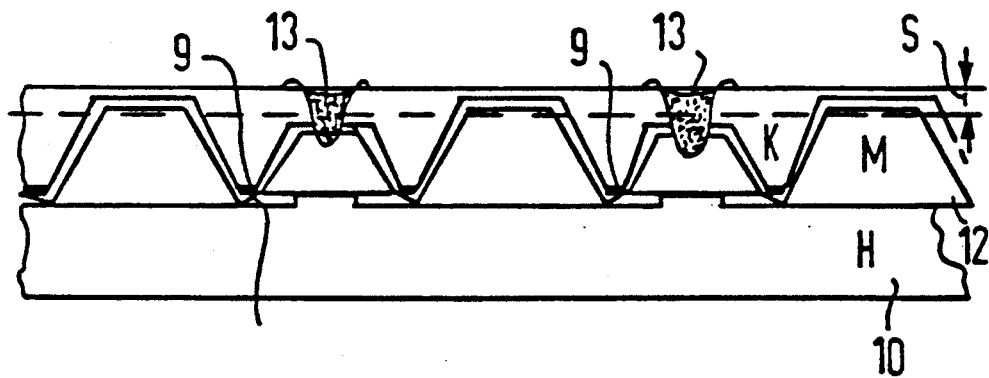
FIG. 7 is a sectional view illustrating a method of manufacturing a pressure sensor.

The overload member wafer K of FIG. 7 which has its work side down is placed on the membrane wafer 12 (M) that, as shown in FIG. 6, is connected (glued) to the auxiliary wafer 10 (H) and is slightly loaded. The annular masking layer 9 of the overload member K then lies on the membrane 4 and is reinforced by glue. In this condition, that region of the overload member wafer K that lies over the middle island 5 of the membrane chip wafer 12 (M) is fused with the middle island 5 by using laser melting 13 due to local heating with a laser beam. The wavelength and energy of the laser beam are selected such that the overload member wafer K becomes liquid in the emission region and such that the silicon of the middle island 5 superficially melts. Despite the gap between the overload member wafer K and the membrane chip wafer 12 (M), a mechanically stable and temperature-resistant connection 6 is produced.

The adjustment marks needed for adjusting the laser beam can be conventionally applied on the overload member wafer K with a back-side photo-technique. The breaking out of the two membranes 4 that are arranged in the edge region of the wafer lying diametrically opposite one another is simple. The entire wafer packet that is composed of the auxiliary wafe 10 (H), the membrane chip wafer 12 (M) and the overload member wafer K can be brought into a defined position on a chuck which is adjusted in the laser apparatus by engaging the two holes with adjustment pins.

Instead of laser melting 13, glue or some other rigid connection of the middle island 5 of the membrane chip 3 to the overload member 7 is also possible in the region of the fixed connection 6 between the membrane chip 3 and the overload member 7. For example, a small amount of glue can be applied onto the middle island 5 of the membrane chip 3 or in the annular region of the overload member 7 in the interior of the etching mask 9. The joining of the overload member wafer K to the membrane chip wafer 12 (M) can thereby occur without adjustment aids since these two wafers engage inside one another.

After the joining of the overload member wafer K to the membrane chip wafer 12 (M) and to the auxiliary wafer 10 (H), the surface of the overload member wafer K that is then visible in the wafer triad is then ground. According to FIG. 7, the grinding distance S is dimensioned such that the membrane chip wafer 12 (M) is at least slightly ground. After the grinding distance S has been carried out, the overload member wafer K is divided into the individual overload members 7. As a result of cleaning, the annular gaps between the overload member 7 and the membrane chip wafer 12 (M) are exposed and the masking layers 9 on the annular surface of the overload members 7 are dissolved through the annular gaps. The membranes 4 thus have a distance from the overload members 7 that exactly corresponds to the thickness of the masking layer 9.

Finally, the membrane chip layer 12 (M) is lifted off from the auxiliary wafer 10 (H). The membranes 4 then move back to their quiescent position. The overload members 7 are drawn into the membrane chip 3 by the amount of the deflection caused by the hump height 19. The hump height 19 thus defines the distance D1.

The membrane chip wafer 12 (M) into which the overload members 7 are now integrated can now be joined to the carrier chips 2 or, respectively, to a carrier chip wafer in the conventional way. The adjustment of the distances D1 and D2 in the method of the invention is effected, in self-aligning fashion. The hump height 19 of the auxiliary wafer 10 (H) defines the distance D1 and the distance of the masking layer 9 in the second photo-technique step with respect to the manufacture of the overload member wafer K defines the distance D2.

Figure 8:
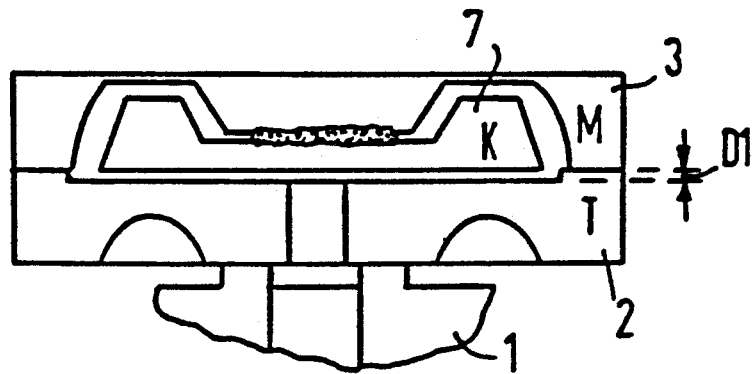
FIG. 8 is a sectional view illustrating a pressure sensor according to the invention.

As shown in FIG. 8, the distance D1 can also be set by etching a depression into the carrier chip 2. In this case, a planar wafer can serve as auxiliary wafer 10 (H).

Although the invention has been described with respect to preferred embodiments, it is not to be so limited as changes and modifications can be made which are within the full intended scope of the invention as defined by the appended claims.

I claim as my invention:

1. A pressure sensor which is protected from overload comprising, a housing, a carrier member with one side attached to said housing and having a second side which is substantially planar, a silicon membrane member which is annular in shape and has an outer edge portion which is connected to said substantially planar second side of said carrier member, said silicon membrane member formed with an annular membrane portion which is substantially thinner than said outer edge portion and spaced from said second side of said carrier member and a middle island portion of said membrane member which extends toward said second side of said carrier member, an overload member with one side of a center portion attached to said middle island of said membrane member, the second side of said overload member formed substantially planar and spaced from said second side of said carrier member by a distance D1 when said membrane member is not deflected, and the outer portion of said overload member formed with an annular member which extends from the second side adjacent said annular membrane portion and spaced a distance D2 from said membrane portion when said membrane is not deflected.

2. A pressure sensor according to claim 1 wherein said outer portion of said overload member is planar.

3. A silicon membrane pressure sensor according to claim 1 wherein said carrier member (2), said membrane member (3) and said overload member (7) are annularly shaped.

4. A silicon membrane pressure sensor according to claim 1 wherein said carrier member (2) is formed with an annular groove on its back side for decoupling said membrane member (3) from said housing (1) of the pressure sensor.

* * * * *